US008554217B2

(12) United States Patent
Shin et al.

(10) Patent No.: US 8,554,217 B2
(45) Date of Patent: Oct. 8, 2013

(54) SYSTEM AND METHOD FOR AUTOMATICALLY SETTING ENVIRONMENT OF USER TERMINAL

(75) Inventors: Hyun Soon Shin, Daejeon (KR); Hyun Moon Shin, Daejeon (KR); Jun Jo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 164 days.

(21) Appl. No.: 13/032,060

(22) Filed: Feb. 22, 2011

(65) Prior Publication Data

US 2011/0207449 A1   Aug. 25, 2011

(30) Foreign Application Priority Data

Feb. 23, 2010   (KR) .................. 10-2010-0016386
Dec. 6, 2010    (KR) .................. 10-2010-0123309

(51) Int. Cl.
*H04W 4/00* (2009.01)

(52) U.S. Cl.
USPC .................. 455/435.1; 455/456.1; 455/414.1; 455/414.2

(58) Field of Classification Search
USPC .... 455/435.1, 456, 414.1, 414.2; 379/207.02
See application file for complete search history.

(56) References Cited

U.S. PATENT DOCUMENTS

| 7,603,112 | B2 * | 10/2009 | Huomo et al. ............. 455/414.2 |
| 7,774,439 | B2 * | 8/2010 | Baek et al. .................... 709/220 |
| 2002/0119788 | A1 * | 8/2002 | Parupudi et al. .............. 455/456 |
| 2004/0043758 | A1 * | 3/2004 | Sorvari et al. ............. 455/414.1 |
| 2006/0063563 | A1 | 3/2006 | Kaufman |
| 2007/0142042 | A1 * | 6/2007 | Thoresson .................... 455/418 |
| 2010/0128863 | A1 * | 5/2010 | Krum et al. ............. 379/207.02 |
| 2010/0317371 | A1 * | 12/2010 | Westerinen et al. ....... 455/456.6 |

FOREIGN PATENT DOCUMENTS

| KR | 1998-0007104 | 3/1998 |
| KR | 10-2005-0102543 | 10/2005 |
| KR | 10-2009-0116667 | 11/2009 |

* cited by examiner

*Primary Examiner* — Charles Shedrick
(74) *Attorney, Agent, or Firm* — Staas & Halsey LLP

(57) ABSTRACT

A system for automatically setting an environment of a user terminal includes a space and context-aware device for sensing a space and a context using a plurality of sensors, defining environment setting information corresponding to the sensed space and context, and sending the defined environment setting information to a user terminal, thereby requesting environment setting or release. Further, the system for automatically setting an environment of a user terminal includes a user terminal for changing environment setting mode while communicating with the space and context-aware device and automatically changing to a status corresponding to the environment setting information when the environment setting information is received.

10 Claims, 10 Drawing Sheets

SYSTEM AND METHOD FOR AUTOMATICALLY SETTING ENVIRONMENT OF USER TERMINAL

CROSS-REFERENCE TO RELATED APPLICATION(S)

The present invention claims priority of Korean Patent Application No. 10-2010-0016386, filed on Feb. 23, 2010, and Korean Patent Application No. 10-2010-0123309, filed on Dec. 6, 2010, which are incorporated herein by references.

FIELD OF THE INVENTION

The present invention relates to sensing and context awareness-based technology for automatically setting the environment of a user terminal; and, particularly, to a system and method for automatically setting the environment of a user terminal, which is adapted to sense the location and space of a user by using a plurality of sensors, to define information about the setting of the environment of a user terminal suitable for the context, and to automatically set and restore information about the setting of the environment of the user in cooperation with the user terminal of the user.

BACKGROUND OF THE INVENTION

With the development of Information Technology (IT), living environments and residential environments have rapidly developed, so that energy and environmental problems have become issues. Therefore, the necessity for research and development into low-carbon green growth has been increasing. Although a lot of research has been carried out to meet this necessity, the research is in its early stage.

In particular, with the advent of the era in which each person is using one or more user terminals e.g., one or more mobile phones, noise and radio wave pollution caused by the neglectful use of user terminals and traffic accidents caused by communication while driving are frequently occurring in pubic places, such as an office, a classroom, a conference room, a theater, an airplane, an automobile, and a hospital. Accordingly, the demand for alternatives for providing etiquette and green environment services, e.g., the prevention of noise, the prevention of traffic accidents, the blocking of radio interference in important facilities, energy conservation based on the use of less battery power, and the like has been increasing.

A conventional alternative for providing a user terminal-related etiquette service in public places is configured to issue a broadcast to ask users to switch user terminals to vibration mode or ask users to turn off their user terminals. Another conventional alternative is based on a variety of research into the interruption and blocking of radio waves. However, the conventional alternative is problematic in that it is difficult to apply radio blocking to all user terminals in a public place, and in that it is difficult to rapidly release radio blocking in the event of an emergency, even when radio waves sent and received by all user terminals have been blocked.

SUMMARY OF THE INVENTION

In view of the above, the present invention provides a system and method for automatically setting the environment of a user terminal, which is capable of providing etiquette and green environment services, e.g., the prevention of noise, the prevention of traffic accidents, the blocking of radio interference in important facilities, energy conservation (based on the use of less battery power and the like in public places such as an office, a classroom, a conference room, a theater, an airplane, an automobile and a hospital.

Further, the present invention provides a system and method for automatically setting the environment of a user terminal, which is capable of sensing the location and space of a user by using a space and context-aware device and multiple sensors, defining information about the setting of the environment of a user terminal in conformity with the context, guaranteeing the privacy of the user and preventing information about entry and exit into and from the space and information about the location from being maliciously used, and automatically setting and restoring information about the setting of the environment of the user terminal in cooperation with the user terminal of the user.

Further, the present invention provides a system and method for automatically setting the environment of a user terminal, which is capable of automatically setting and restoring the environment setting of a user terminal in conformity with the context by analyzing the location, space, direction of motion and motion state of a user.

In accordance with a first aspect of the present invention, there is provided a system for automatically setting an environment of a user terminal, including: a space and context-aware device for sensing a space and a context using a plurality of sensors, defining environment setting information corresponding to the sensed space and context, and sending the defined environment setting information to a user terminal, thereby requesting environment setting or release; and a user terminal for changing environment setting mode while communicating with the space and context-aware device and automatically changing to a status corresponding to the environment setting information when the environment setting information is received.

In accordance with a second aspect of the present invention, there is provided a system for automatically setting an environment of a user terminal, including: a space and context sensing unit for performing sensing on a user or a user terminal which is located in a specific space and a specific context using a multi-modal sensor unit, and outputting sensed information; a space and context analysis unit for analyzing at least one of entry and exit, a location, a space, a direction, and a speed based on the sensed information, and defining environment setting information corresponding to the specific space or specific context; and an automatic environment setting communication unit for including the environment setting information transferred by the analysis unit in an environment setting change message, and sending the environment setting change message to the user terminal.

In accordance with a third aspect of the present invention, there is provided a system for automatically setting an environment of a user terminal, including: a message transmission and reception unit for receiving an automatic environment setting ID from a space and context-aware device after a user or a user terminal has entered a specific space; an automatic environment setting unit for storing the automatic environment setting ID, and changing environment setting mode from manual setting mode to automatic environment setting mode; and an automatic environment setting status management unit for when receiving an environment setting change information from the space and context-aware device, automatically changing to a status corresponding to the environment setting change information.

In accordance with a fourth aspect of the present invention, there is provided a method of automatically setting an environment of a user terminal, including: sensing a user or a user terminal using a plurality of sensors by means of a multi-modal sensor unit, and outputting sensed information; analyzing a space and a context based on the sensed information; determining whether the user or user terminal has entered or exited into or from a specific space; if the user or user terminal has entered the specific space, performing automatic environment setting communication with the user terminal; and requesting the user terminal to make a change to environment setting corresponding to the specific space.

In accordance with a fifth aspect of the present invention, there is provided a method of automatically setting an environment of a user terminal, including: receiving an automatic environment setting ID from a space and context-aware device after a user or a user terminal has entered into a specific space; storing the received environment setting ID, and changing environment setting mode from manual setting mode to automatic environment setting mode; and when receiving environment setting change information from the space and context-aware device, automatically changing to a status corresponding to the environment setting change information.

In accordance with the embodiments of the present invention, the location and space of a user using multiple sensors are sensed, information about the setting of the environment of a user terminal in conformity with the context is defined, the privacy of the user is guaranteed and information about entry and exit into and from the space and information about the location is prevented from being maliciously used, and information about the setting of the environment of the user terminal in cooperation with the user terminal of the user is automatically set and restored. Consequently, it is possible to provide etiquette, safety and green environment services (e.g., the prevention of noise, the prevention of traffic accidents, the blocking of radio interference in important facilities, energy conservation based on the use of less battery power and the like) in public places such as an office, a classroom, a conference room, a theater, an airplane, an automobile, a hospital and the like.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
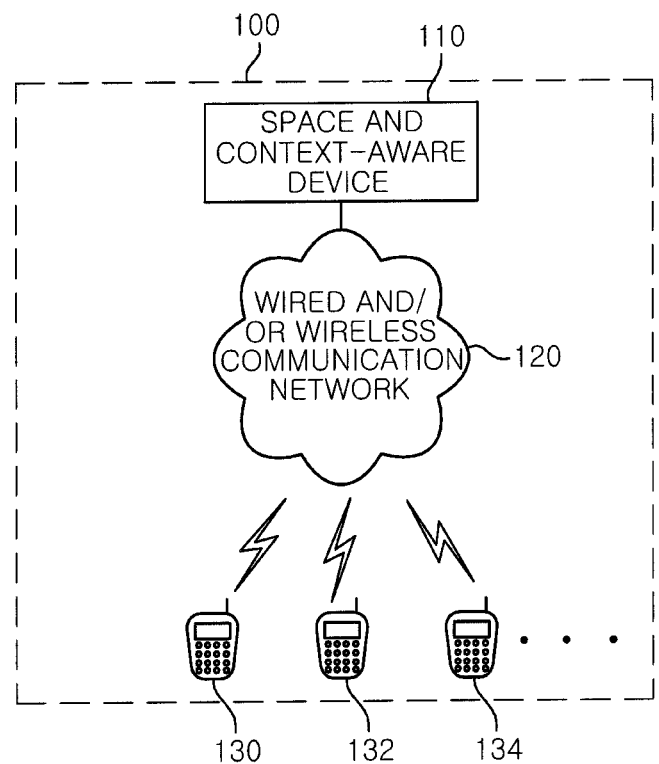
FIG. 1 is a block diagram showing the configuration of an automatic user terminal environment setting system in accordance with an embodiment of the present invention.

FIG. 1 is a block diagram showing the configuration of an automatic user terminal environment setting system 100 in accordance with an embodiment of the present invention.

Referring to FIG. 1, the automatic user terminal environment setting system 100 includes a space and context-aware device 110 and one or more user terminals 130, 132 and 134. The space and context-aware device 110 and the user terminals 130, 132 and 134 are connected to each other or operate in cooperation with each other via a wired and/or wireless communication network 120.

Here, the automatic user terminal environment setting system 100 is constructed in a specific space, or is constructed to include a plurality of space and context-aware devices and a plurality of user terminals over various spaces.

The space and context-aware device 110 senses the locations and spaces of users (or user terminals) using a plurality of sensors, and send environment setting information suitable for the context to the user terminals 130, 132 and 134. Accordingly, the user terminals 130, 132 and 134 applies the environment setting information, received from the space and context-aware device 110 therein.

Here, the user terminals 130, 132 and 134 may move to different spaces, and includes computing devices capable of sending and receiving data over a specific wireless frequency, such as mobile phones, notebook computers, Personal Digital Assistants (PDAs), and Portable Multimedia Players (PMPs).

Figure 2:
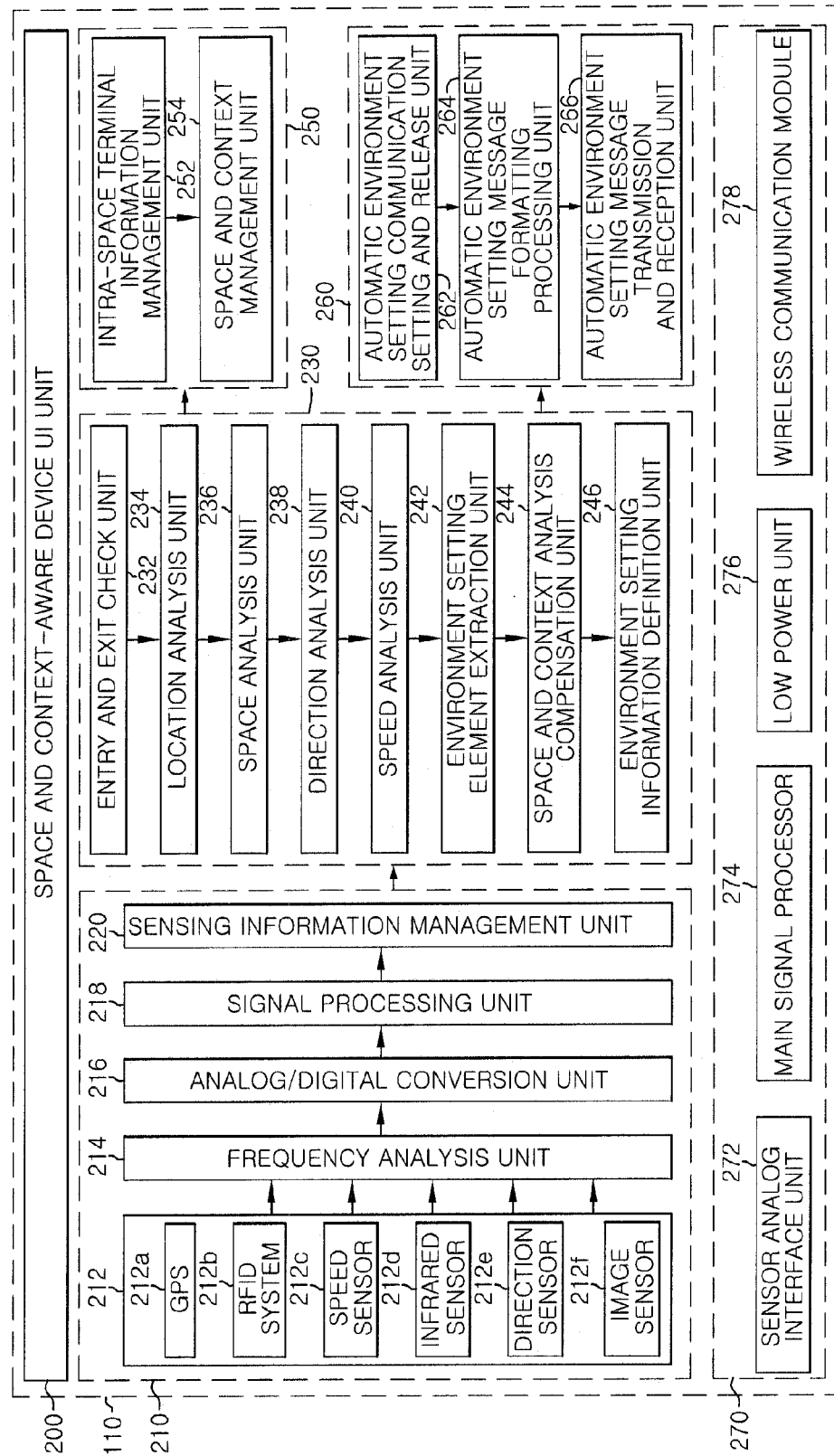
FIG. 2 is a block diagram showing the configuration of a space and context-aware device in accordance with the embodiment of the present invention.

FIG. 2 is a block diagram showing the configuration of the space and context-aware device 110 in accordance with an embodiment of the present invention.

Referring to FIG. 2, the space and context-aware device 110 includes a space and context-aware device user interface (UI) unit 200, a space and context sensing unit 210, a space and context analysis unit 230, a space and context management unit 250, an automatic environment setting communication unit 260, and a hardware (H/W) control unit 270.

The space and context-aware device UI unit 200 sets a space, e.g., an office, a theater, a performance hall, a conference room, a classroom, a train, an airplane, a hospital, an automobile, and the like in which the space and context-aware device 110 is located, and sets context information, e.g., in conference, in class and the like. Further, the pace and context-aware device UI unit 200 provides an interface via which the space and context-aware device 110 makes access to and exchanges data with a plurality of user terminals. Furthermore the pace and context-aware device UI unit 200 provides the operating status of function blocks to the user, and, when a specific command is input by the user, transfers the command to a corresponding function block.

The space and context sensing unit 210 collects signals from a plurality of sensors, and manages the collected signals. The space and context sensing unit 210 includes a multi-modal sensor unit 212 for sensing spaces and contexts using one or more of a plurality of sensors, including a Global Positioning System (GPS) 212a, a Radio-Frequency IDentification (RFID) system 212b, a speed sensor 212c, an infrared sensor 212d, a direction sensor 212e and an image sensor, a frequency analysis unit 214 configured to operate in cooperation with the sensor of the multi-modal sensor unit 212 and to analyze a frequency, an analog/digital conversion unit 216 for converting a sensing signal transferred by the frequency analysis unit 214, from an analog signal to a digital signal, a signal processing unit 218 for analyzing and processing the converted digital signal, and a sensing information management unit 220 for managing the signal-processed sensing information.

The space and context analysis unit 230 receives sensed information from the space and context sensing unit 210, and extracts and defines environment setting elements necessary for a current space by checking the status of the entry and exit of a user or a user terminal and analyzing a location, a space, a direction and a speed based on the sensed information. The space and context analysis unit 230 includes an entry and exit check unit 232 for checking the entry and exit of the user or user terminal, a location analysis unit 234 for determining a current location, a space analysis unit 236 for determining the space, a direction analysis unit 238 for determining the direction of a motion, a speed analysis unit 240 for measuring the speed, an environment setting element extraction unit 242 for extracting elements used to define the environment setting information, a space and context analysis compensation unit 244 for compensating for space and context analysis information based on the environment setting elements, and an environment setting information definition unit 246 for defining the environment setting information.

The space and context analysis unit 230 analyzes a space and a context on the basis of a user or a user terminal using sensed information. It will be apparent that the space and the context can be analyzed based only on the user or the user terminal depending on sensed information or a method of implementing an embodiment of the present invention.

The space and context management unit 250 manages space context information and user terminal information transferred by the space and context analysis unit 230. The space and context management unit 250 includes an intra-space terminal information management unit 252 for managing information about the user terminal in the space (e.g., an automatic environment setting ID, space entry and exit information, and location information) and a space and context information management unit 254 for managing context information (e.g., in conference, in class, while driving, and while stopping) related to each space (e.g., an office, a theater, a performance hall, a conference room, a classroom, a train, an airplane, a hospital, and an automobile).

Here, the information about the user terminal for each space managed by the intra-space terminal information management unit 252 may be temporarily stored and managed only when the user terminal is located in a space which requires automatic environment setting, and may not include private information related to the user terminal, e.g., a subscriber name, a phone number, or the unique information of the user terminal (e.g., International Mobile Equipment Identity (IMEI), International Mobile Subscriber Identity (IMSI), Electronic Serial Number (ESN) and the like).

The automatic environment setting communication unit 260 creates, sends and receives a message based on the environment setting information transferred by the space and context analysis unit 230. The automatic environment setting communication unit 260 includes an automatic environment setting communication setup and release unit 262 for setting up communication to change and release the environment setting of the user terminal, an automatic environment setting message formatting processing unit 264 for creating a message including environment setting information, and an automatic environment setting message transmission and reception unit 266 for sending the created message to the user terminal and a plurality of user terminals located in a specific space and receiving corresponding response messages.

The hardware control unit 270 operates in cooperation with respective function blocks. The hardware control unit 270 includes a sensor analog interface unit 272 for receiving analog signals from various types of sensors, a main signal processor 274 for booting devices and executing software modules, a low power unit 276 for providing low power service, and a wireless communication module 278 functioning as an interface for wireless communication.

Figure 3:
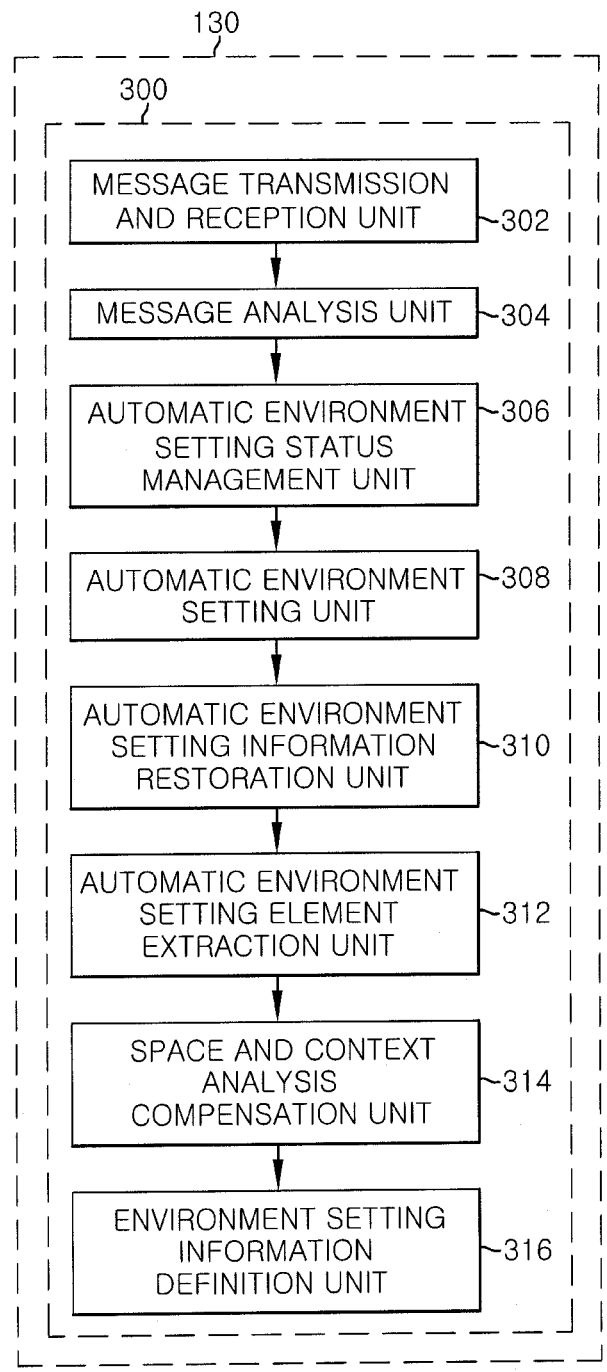
FIG. 3 is a block diagram showing the configuration of an automatic environment setting processing unit in accordance with the embodiment of the present invention, which is located in a user terminal and supports an automatic environment setting service.

FIG. 3 is a block diagram showing the configuration of an automatic environment setting processing unit in accordance with an embodiment of the present invention, which is located in a user terminal and supports an automatic environment setting service.

Referring to FIG. 3, the automatic environment setting processing unit 300 of the user terminal 130, which is used to support an automatic environment setting service, includes a message transmission and reception unit 302 for transmitting and receiving messages while communicating with the space and context-aware device 110; a message analysis unit 304 for analyzing received messages; an automatic environment setting status management unit 306 for managing the current environment setting status of the user terminal (the environment setting information present prior to a request for an automatic environment setting) and requested automatic environment setting information; an automatic environment setting unit 308 for enabling a change to automatic environment mode requested by the space and context-aware device 110 and enabling a change of the environment setting status to automatic environment setting information; an automatic environment setting information restoration unit 310 for enabling a change to manual environment setting mode which enables a return to the environment setting which was present prior to the setting of the automatic setting change and enabling the user to perform an environment setting change; an environment setting element extraction unit 312 for extracting elements used to define environment setting information; a space and context analysis compensation unit 314 for compensating for space and context analysis information based on the environment setting elements; and an environment setting information definition unit 316 for defining final environment setting information based on the compensated space and context analysis information.

As described above, the automatic environment setting processing unit 300 of the user terminal 130 analyzes an environment setting request message transmitted by the space and context-aware device 110, and changes the existing environment of the user terminal 130, that is, the status of software and hardware, to a requested environment in response to a request for an automatic environment setting included in the message.

The environment setting information requested by the space and context-aware device 110 from the user terminal 130 may be a command to request the control of at least one of, e.g., manner mode, call blocking, frequency blocking, and a deterioration in call quality. Based on this information, the environment status of the user terminal 130 may be changed. When an environment setting release message is received later, the set environment status may be restored to the original status. Furthermore, if the current status of the user terminal 130 is identical to the requested environment status, the current environment status can be maintained without changing the setting.

Referring to FIGS. 4 to 8, an automatic environment setting and restoration process, which is performed by the user terminal 130 and the space and context-aware device 110, will be described in detail below.

Figure 4:
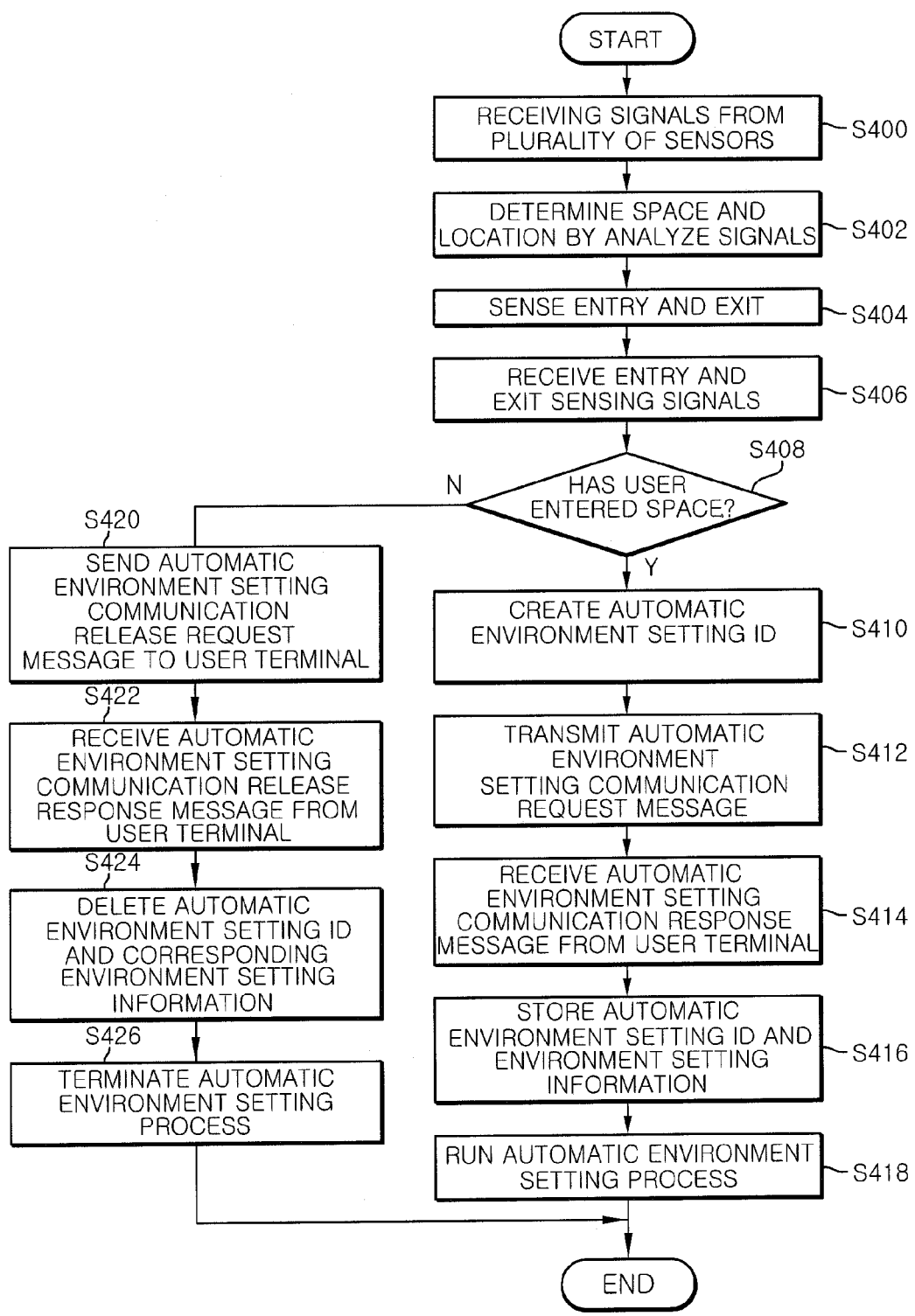
FIG. 4 is a flow chart showing an automatic environment setting process in accordance with the embodiment of the present invention, which is performed by the space and context-aware device.

FIG. 4 is a flow chart showing an automatic environment setting process of the space and context-aware device in accordance with an embodiment of the present invention.

Referring to FIG. 4, in the space and context sensing unit 210 of the space and context-aware device 110, the multi-modal sensor unit 212 receives sensed signals from the GPS 212a, the RFID system 212b, the speed sensor 212c, the infrared sensor 212d, the direction sensor 212e and the image sensor to sense a space and a context in step S400.

Accordingly, the sensed signals are transferred to the space and context analysis unit 230, the space and context analysis unit 230 determines the current location and space of each user or user terminal 130 by analyzing the sensed signal in step S402, and the analyzed space information is stored in the space and context management unit 250.

In step S404, sensing is performed to check the entry and exit of the user terminal 130 or user into and from the determined space. That is, sensing is performed using the sensors of the multi-modal sensor unit 212. In step S406, the sensed signals are received by the space and context analysis unit 230. The space and context analysis unit 230 determines location information, for example, by reading an RFID tag, provided in the user terminal 130 or possessed by the user, using the RFID system 212b, and determines the location at which the user is currently placed and the direction in which the user is currently moving using the speed sensor 212c and the direction sensor 212e.

If the entry or exit of the user is sensed, the space and context analysis unit 230 determines whether the user has entered or exited into or from a space in step S408. As a result of the determination, if it is determined that the user has entered into the space, in step S410, the automatic environment setting communication setup and release unit 262 of the automatic environment setting communication unit 260 creates an automatic environment setting ID necessary only for the management of automatic environment setting to assign the created automatic environment setting ID to the corresponding user terminal in order to guarantee the privacy of the user and prevent space entry and exit information and location information from being used for malicious purposes. Further, the automatic environment setting message formatting processing unit 264 includes the automatic environment setting ID in an automatic environment setting communication request message. In step S412, the automatic environment setting communication request message is transmitted to the user terminal via the automatic environment setting message transmission and reception unit 266.

Thereafter, in step S414, when the automatic environment setting message transmission and reception unit 266 receives an automatic environment setting communication response (Response and Confirm) message from a user terminal, the automatic environment setting message transmission and reception unit 266 transfers the automatic environment setting ID and the environment setting information included in the automatic environment setting communication response message to the space and context management unit 250. Further, in step S416, the space and context management unit 250 stores and manages the automatic environment setting ID and the environment setting information in association with the user terminal.

Then, in step S418, the space and context analysis unit 230 runs an automatic environment setting process for the user terminal, the entry of which has been determined. For example, the space and context analysis unit 230 includes the status information (e.g., manner mode, a radio blocking, a call blocking and the like) of the user terminal, which needs to be used in the space in which the user is currently located, in an automatic environment setting change message in cooperation with the automatic environment setting communication unit 260, and sends this message to the user terminal.

On the other hand, as a result of the determination in step S408, if it is determined that the user has exited, a control process proceeds to step S420, and the automatic environment setting communication unit 260 sends an automatic environment setting communication release request message to the user terminal. In step S422, when the automatic environment setting message transmission and reception unit 266 receives an automatic environment setting communication release response message from the user terminal, the automatic environment setting message transmission and reception unit 266 transfers the received message to the space and context management unit 250.

In step S424, the space and context management unit 250 checks the automatic environment setting ID included in the message and then deletes the automatic environment setting ID and the corresponding environment setting information assigned to the corresponding user terminal when the corresponding user terminal entered into the specific space. Further, in step S426, the automatic environment setting process for the corresponding user terminal is terminated.

Figure 5A:
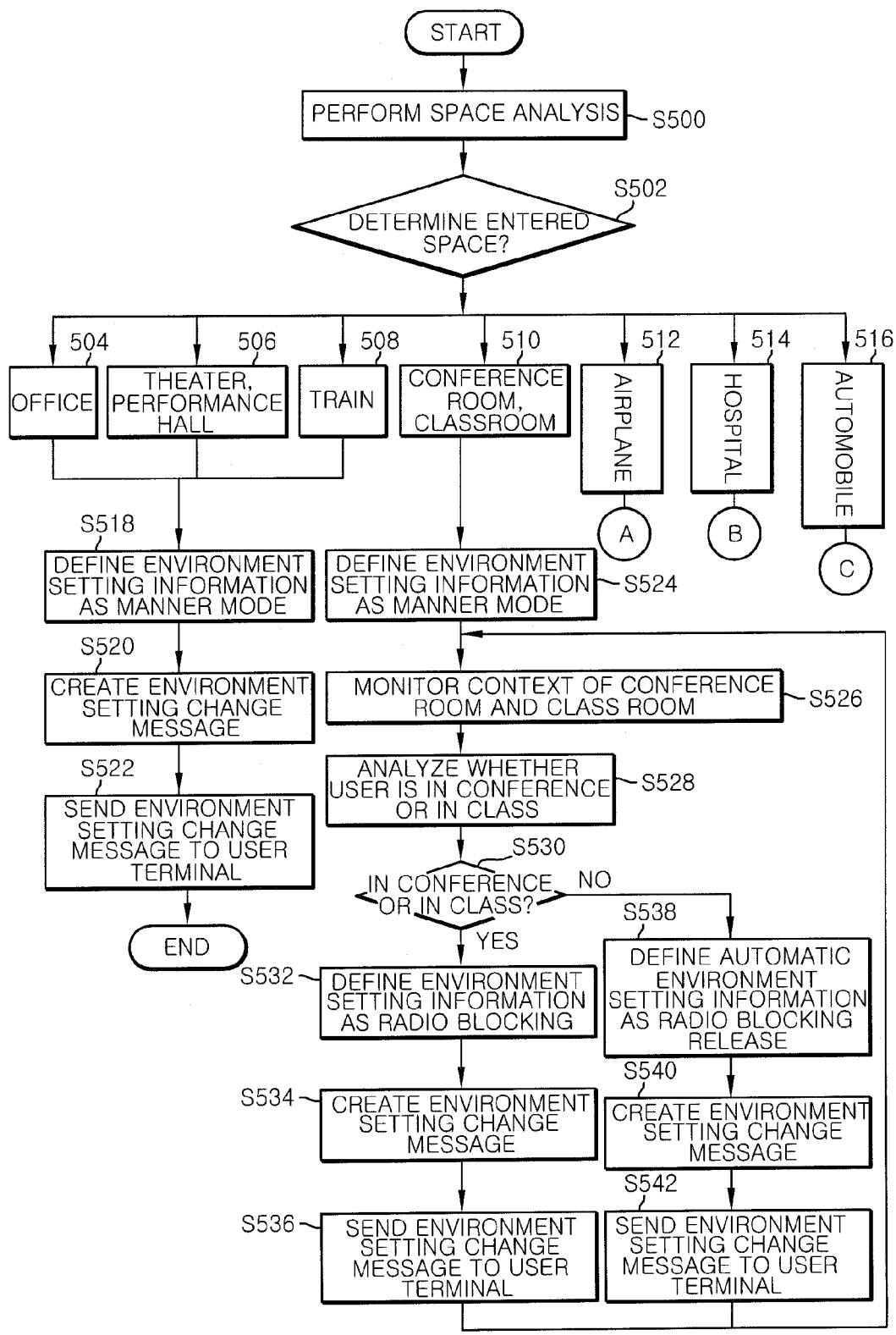
FIGS. 5A to 5C are flow charts showing sensing and analyzing processes and processes of defining and processing automatic environment setting information in accordance with the embodiment of the present invention, which are performed by the space and context-aware device.
Figure 5B:
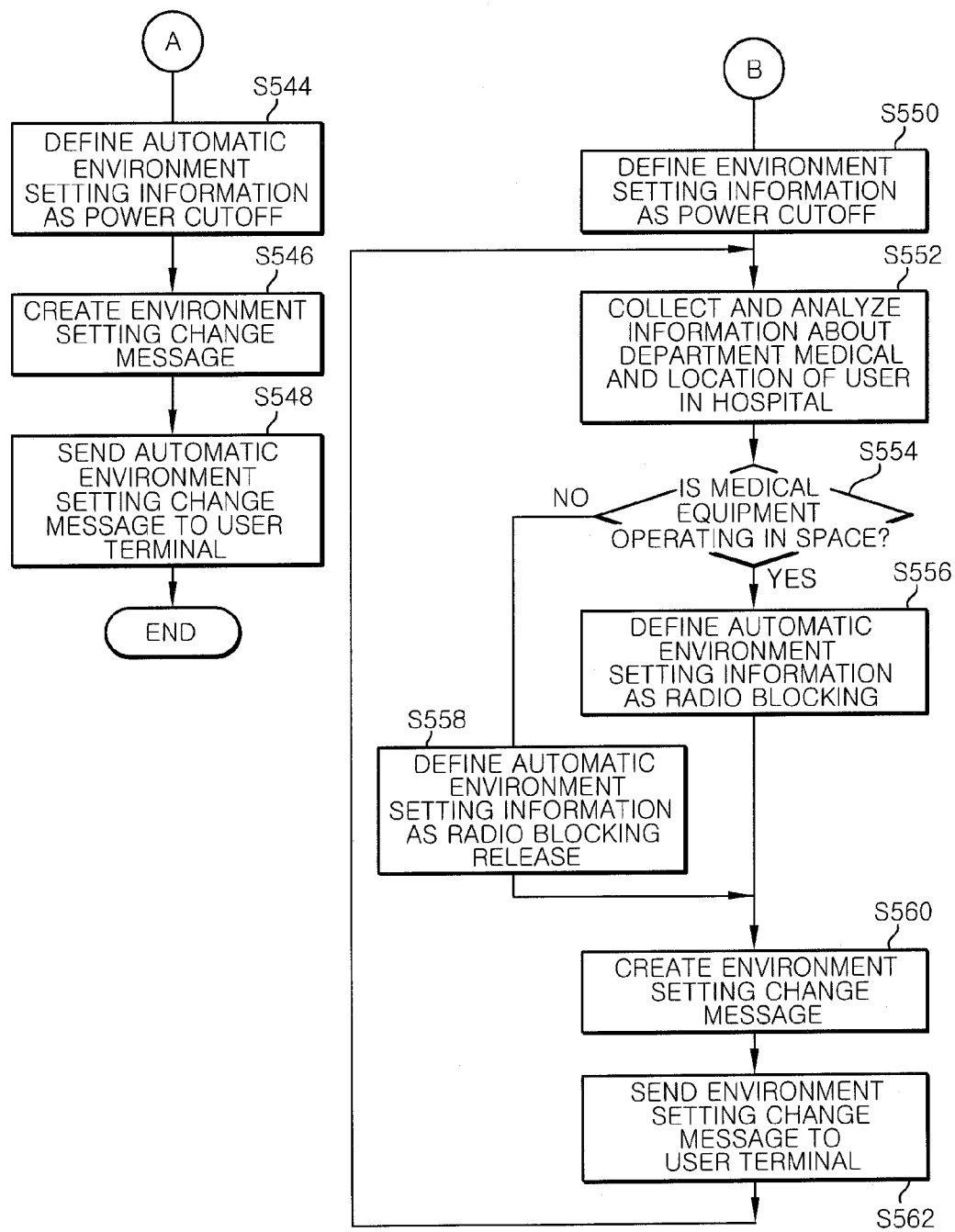
Figure 5C:
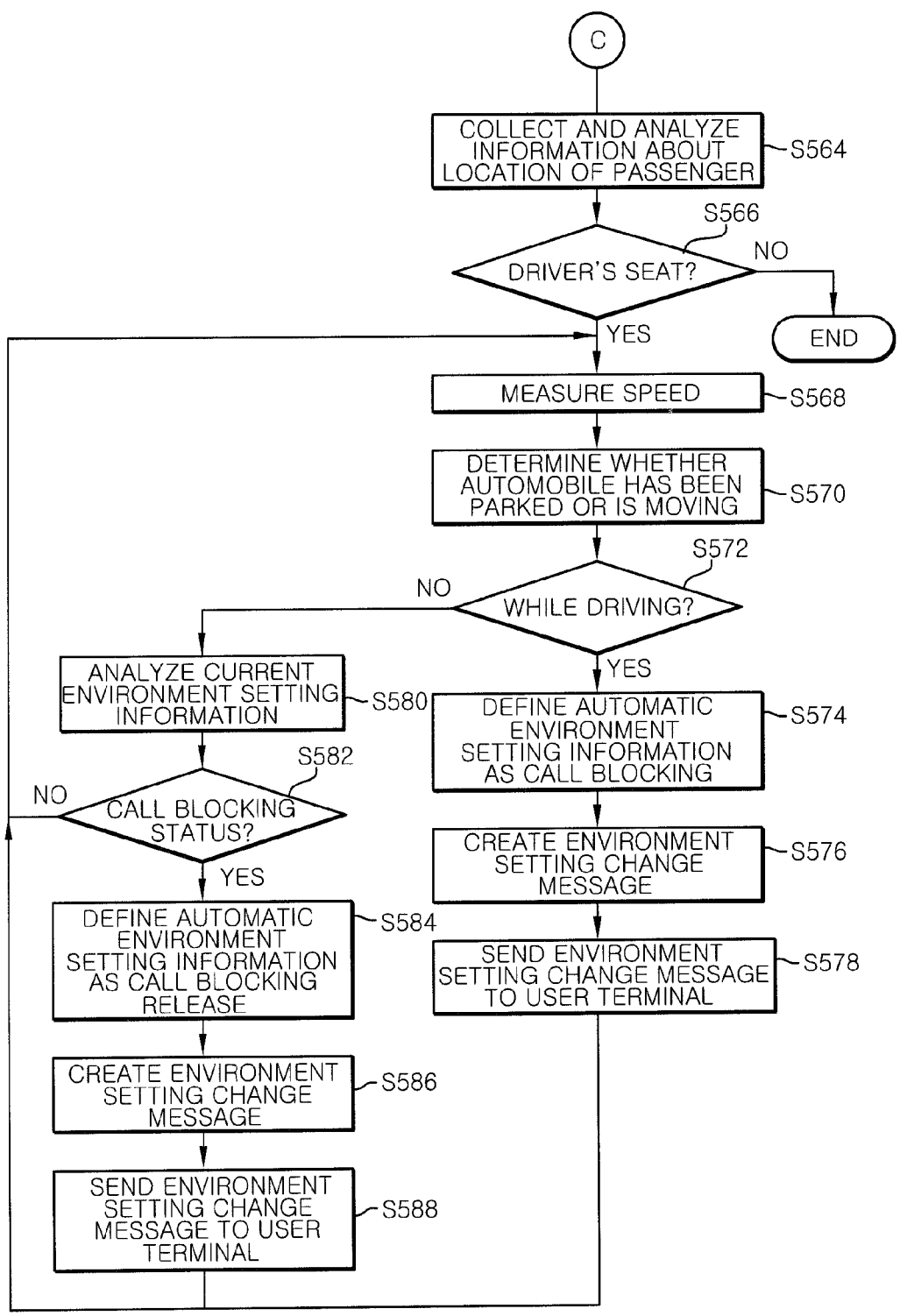

FIGS. 5A to 5C are flow charts showing sensing and analyzing processes and processes of defining and processing automatic environment setting information in accordance with an embodiment of the present invention, which are performed by the space and context-aware device.

Referring to FIG. 5A, the space and context-aware device 110 sends an environment setting change message suitable for a corresponding space to the user terminal by means of space analysis after having sent the automatic environment setting ID to the user terminal by transmitting and receiving the environment setting communication message to and from the user terminal, as shown in FIG. 4.

The space and context analysis unit 230 of the space and context-aware device 110 performs space analysis related to the user or the user terminal in step S500, and determines the space into which the user entered in step S502.

If the space in which the user is located is one of an office 504, a theater or a performance hall 506, and a passenger train 508, the control process goes to step S518 and the automatic environment setting information is defined as "manner mode", and the defined environment setting information is transferred to the automatic environment setting communication unit 260. Further, in step S520, the automatic environment setting communication unit 260 creates an environment setting change message including the environment setting information defined as "manner mode".

In step S22, the created environment setting change message is sent to user terminals located in the corresponding space.

Meanwhile, as a result of the determination in step S502, if it is determined that the space into which the user has entered is a conference room or classroom 510, the control process proceeds to step S524 and the automatic environment setting information is defined as "manner mode".

Thereafter, in step S526, the space and context analysis unit 230 continuously monitors the context of the conference room and classroom based on the sensing information received from the space and context sensing unit 210, and determines whether the user is in conference or in class by analyzing the context in step S528. At this time, whether the user is in conference or in class is determined, for example, at each preset time interval.

If it is determined that the user is in conference or in class in step S530, the control process proceeds to step S532 and the space and context analysis unit 230 defines the automatic environment setting information as "radio blocking" (for example, it is possible to set the operating mode to manner mode) and transfers the defined environment setting information to the automatic environment setting communication unit 260.

Thereafter, the automatic environment setting communication unit 260 creates an environment setting change message including the environment setting information defined as "radio blocking" in step S534, and sends the created environment setting change message to user terminals located in the corresponding space in step S536.

On the other hand, if the user is not in conference or in class but the user is resting or a conference or a class is over in step S530, the control process proceeds to step S538 and the space and context analysis unit 230 defines the automatic environment setting information as "radio blocking release" and sends the defined environment setting information to the automatic environment setting communication unit 260.

Thereafter, the automatic environment setting communication unit 260 creates an environment setting change message including the environment setting information defined as radio blocking release in step S540, and sends the created environment setting change message to user terminals located in the corresponding space in step S42.

After step S536 or step S542, the process goes back to step S526, and then the space and context analysis unit 230 continuously monitors the context of the space until the user moves out of the corresponding space, that is, the conference room or classroom.

Further, as a result of the determination in step S502, if it is determined that the space in which the user is located is an airplane 512, the control process proceeds to step S544 of FIG. 5B, and the automatic environment setting information is defined as "power cutoff". Thereafter, an environment setting change message is created in step S546, and the environment setting change message is sent to the user terminal which is located in the space in step S548.

As a result of the determination in step S502 of FIG. 5A, if it is determined that the space in which the user is currently located is a hospital 514, the control process proceeds to step S50 of FIG. 5B, and the automatic environment setting information is defined as "manner mode". Thereafter, the space and context analysis unit 230 collects and analyzes information about a medical department and location of the user in the hospital in step S552. Then, in step S554, it is determined whether the current space is a space in which medical equipment is operating.

If the space in which the user is currently located is the space in which medical equipment is operating, the automatic environment setting information is defined as "radio blocking" in step S556. Thereafter, an environment setting change message is created based on the defined automatic environment setting information in step S560, and the created environment setting change message is sent to the user terminal which is located in the space in step S562.

On the other hand, in step S554, if it is determined that the user has moved out of the space in which medical equipment is operating by periodic monitoring, the control process goes to step S558 and the automatic environment setting information is defined as "radio blocking release". Then, an environment setting change message is created based on the defined automatic environment setting information in step S560, and the created environment setting change message is sent to the corresponding user terminal in step S562.

Thereafter, the control process goes back to step S552, until the user terminal moves out of the space of the hospital, and the space and context analysis unit 230 repeatedly collects and analyzes information about the medical department and location of the user in the hospital.

In step S502 of FIG. 5A, it is determined that the space in which the user is currently located is in an automobile 516, the control process goes to step S564 of FIG. 5C, and information about the locations of passengers is collected and analyzed to determine the context of the interior of the automobile.

IN step S566, it is determined whether the user is located in the driver's seat of the automobile. If the user is not located in the driver's seat, the control process is terminated because particular environment setting is not required. If the user is located in the driver's seat and is driving the automobile, the control process proceeds to step S568 and the speed of the automobile is measured using the speed sensor 212c.

If it is determined that the user is driving the automobile in step S572 by determining whether the automobile has been parked or is moving in step S570, the control process proceeds to step S574 and the automatic environment setting information is defined as "call blocking" (or a deterioration in call quality, communication frequency blocking and call functionality blocking). An environment setting change message is created based on the defined automatic environment setting information in step S576, and the environment setting change message is sent to the corresponding user terminal in step S578.

Meanwhile, if it is determined that the automobile has been parked or stopped in step S72, the control process goes to step S580 and the current environment setting information is analyzed. Thereafter, in step S582, it is determined whether the automatic environment setting information currently set for the user terminal is "call blocking". If it is determined that the automatic environment setting information is not "call blocking" in step S582, the control process goes back to step S568 and the speed of the automobile is measured while the current status is maintained. On the other hand, if the automatic environment setting information is "call blocking" in step S582, the automatic environment setting information is defined as "call blocking release" in step S584. Further, an environment setting change message is created based on the defined automatic environment setting information in step S586, and the created environment setting change message is sent to the corresponding user terminal in step S588.

After step S578 or step S588, the control process returns to step S568 and it is determined whether to block calls by measuring speed until the user gets out of the automobile driver's seat.

Figure 6:
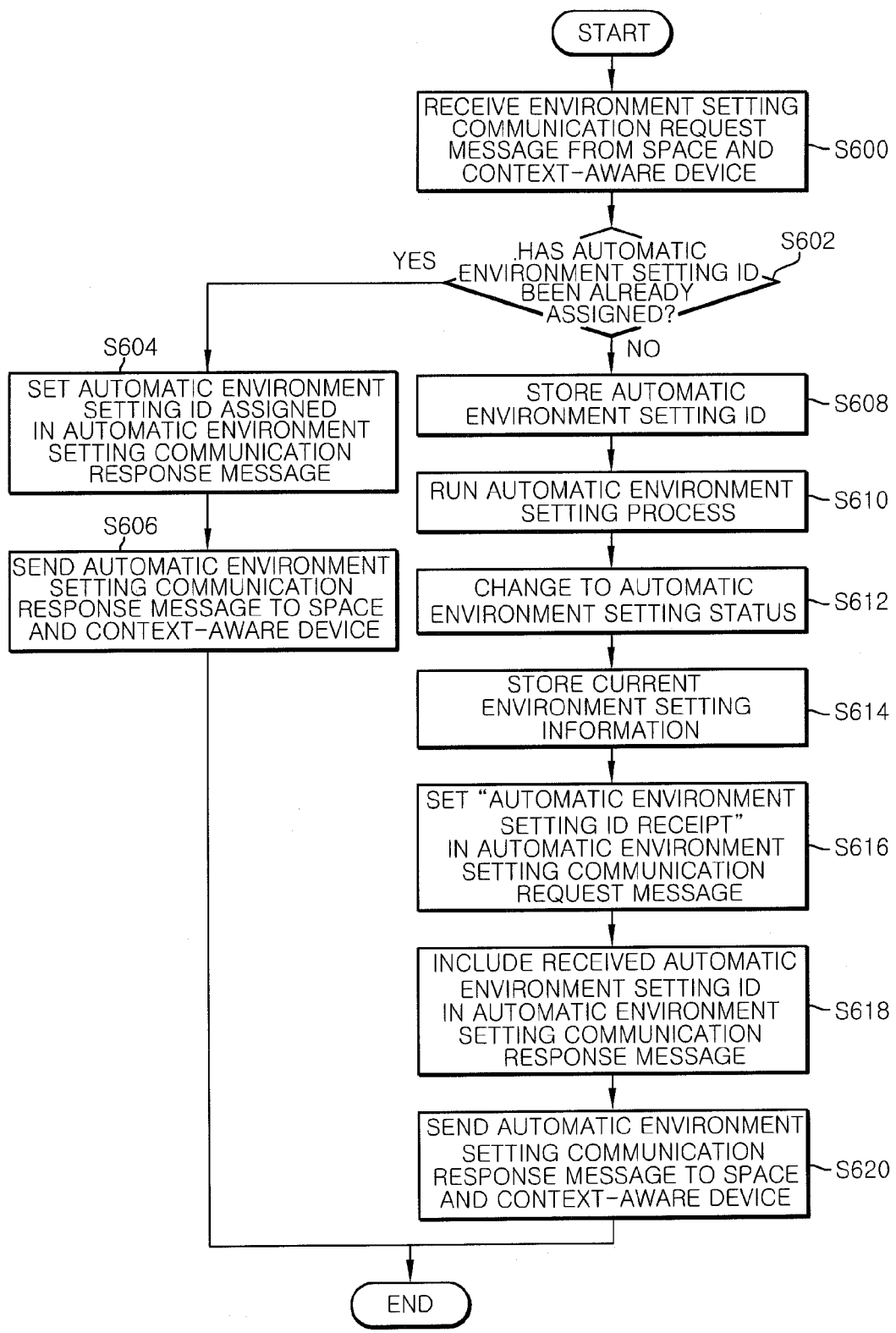
FIG. 6 is a flow chart showing an automatic environment setting communication process in accordance with the embodiment of the present invention, which is performed by the user terminal.

FIG. 6 is a flow chart showing an automatic environment setting communication process in accordance with an embodiment of the present invention, which is performed by the user terminal.

Referring to FIG. 6, the user terminal receives an environment setting request from the space and context-aware device 110, and performs automatic environment setting. If the user terminal has entered or exited into or from a specific space, the message transmission and reception unit 302 of the automatic environment setting processing unit 300 receives the environment setting communication request message from the space and context-aware device 110 in step S600.

Thereafter, in step S602, the automatic environment setting status management unit 306 determines whether an "automatic environment setting ID" which is used to perform automatic environment setting has been already assigned. If the automatic environment setting ID has been already stored, the control process goes to step S604 and the "automatic environment setting ID assigned" is set in an automatic environment setting communication response message and the assigned "automatic environment setting ID" is included in the automatic environment setting communication response message. Thereafter, in step S606, the automatic environment setting communication response message is sent to the space and context-aware device 110.

On the other hand, in step S602, if it is determined that the automatic environment setting ID has not been assigned, the control process goes to step S608 and the "automatic environment setting ID" is extracted from the automatic environment setting communication request message sent by the space and context-aware device 110 and is then stored. Then, in step S610, the automatic environment setting process is run. Thereafter, in step S612, the environment setting status is changed (e.g., the environment setting mode is changed from "manual setting mode" to "automatic environment setting mode"). Thereafter, when if an environment setting change message is received from the space and context-aware device 110, the user terminal is set to an environment (e.g., manner mode, call blocking, radio blocking, and the like) corresponding to environment setting information included in the environment setting change message.

Thereafter, the current environment setting information is stored in step S614, and "automatic environment setting ID receipt" is set in an automatic environment setting communication response message in step S616. The received "automatic environment setting ID" is included in the automatic environment setting communication response message in step S618, and the automatic environment setting communication response message is sent to the space and context-aware device 110 in step S620.

Figure 7:
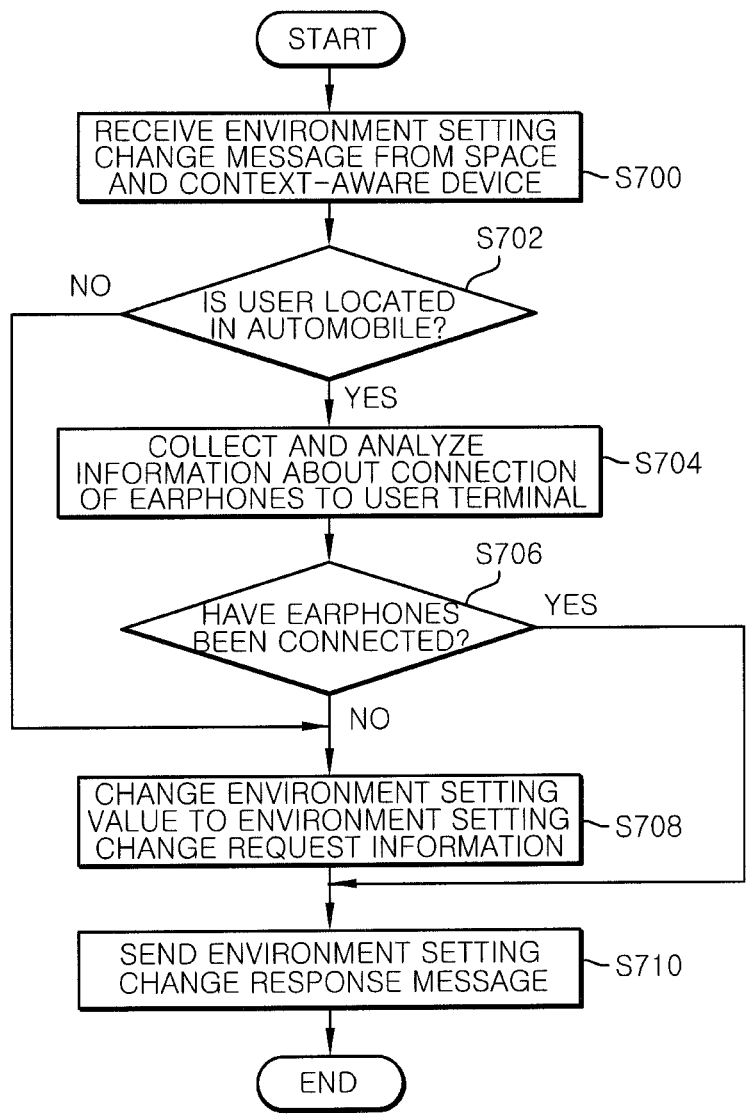
FIG. 7 is a flow chart showing a process of changing automatic environment setting of the user terminal in accordance with the embodiment of the present invention.

FIG. 7 is a flow chart showing a process of changing automatic environment setting in accordance with an embodiment of the present invention, which is performed by the user terminal.

Referring to FIG. 7, after the status of the user terminal has been changed to automatic environment setting mode, as shown in FIG. 6, an environment setting change message is received from the space and context-aware device 110 in step S700.

In step 702, the user terminal determines whether the user is located is in an automobile. Here, the determination of whether the user is located is an automobile may be performed by receiving the information, sensed by the space and context sensing unit 210 of the space and context-aware device 110, using the automatic environment setting element extraction unit 312 of the user terminal, or may be formed by using a sensor additionally or basically provided in the user terminal.

In step S702, if it is determined that the user is located on the driver's seat in the automobile, the control process proceeds to step S704 and information about the connection of the earphones to the user terminal is collected and analyzed. In step S706, if it is determined that the earphones have not been connected, the control process proceeds to step S708 and an environment setting value is changed to the environment setting information (e.g., call blocking information) included in the received environment setting change message, so that the user terminal becomes call blocking status.

Once the change of the environment setting value has been completed, in step S710, an environment setting change response message is sent to the space and context-aware device 110, then the control process is terminated.

Meanwhile, in step S706, if it is determined that the earphones have been connected, the control process jumps to step S710 and the environment setting change response message is sent to the space and context-aware device 110, then the control process is terminated.

In contrast, in step 702, if it is determined that the user is not located in an automobile or in a driver's seat, the control process jumps to step S708 and the environment set value is changed to the environment setting information (e.g., manner mode, radio blocking, call blocking and the like) included in the received environment setting change message. Thereafter, in step S710, the environment setting change response message is sent to the space and context-aware device 110 and then the control process is terminated.

Figure 8:
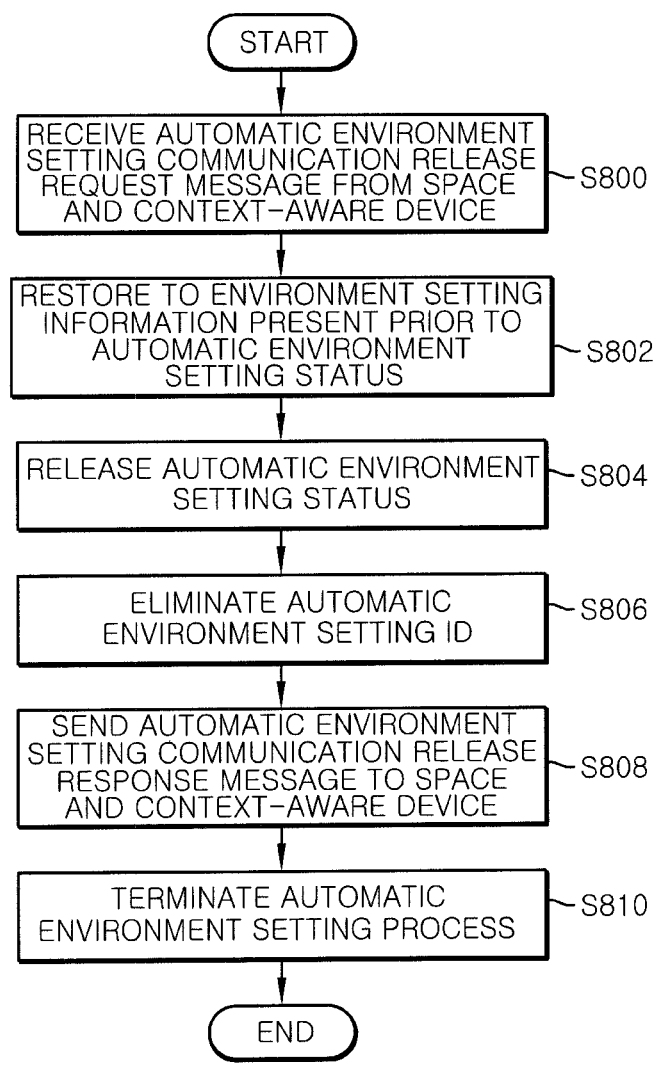
FIG. 8 is a flow chart showing a process of releasing automatic environment setting communication of the user terminal in accordance with the embodiment of the present invention.

FIG. 8 is a flow chart showing a process of releasing automatic environment setting communication of the user terminal in accordance with an embodiment of the present invention.

Referring to FIG. 8, when particular environment setting is not required, as in the case where the user terminal has moved out of a specific space or the user is resting in a specific space, an automatic environment setting communication release request message is received from the space and context-aware device 110 in step S800.

Thereafter, in step S802, the user terminal searches for environment setting information which was present prior to the setting of automatic environment setting status, and the environment setting information of the user terminal is restored to the environment setting information which was present prior to the automatic environment setting. In step S804, the environment setting status of the user terminal is released (e.g., the automatic environment setting mode is returned to manual environment setting mode). The environment setting ID is deleted in step S806, the automatic environment setting communication release response message is sent to the space and context-aware device 110 in step S808, and the environment setting process is terminated in step S810.

Meanwhile, in actual practice, the functionality performed by the space and context-aware device and the functionality performed by the user terminal may be performed by the opposite devices depending on the capacities of the devices and the context and privacy.

The above-described system and method for automatically setting the environment of a user terminal according to the embodiments of the present invention have the following advantages.

That is, the system and method for automatically setting the environment of a user terminal according to the embodiments of the present invention are advantageous in that they are capable of sensing the location and space of a user using multiple sensors, defining information about the While the invention has been shown and described with respect to the embodiments, it will be understood by those skilled in the art that various changes and modifications may be made without departing from the scope of the invention as defined in the following claims.

What is claimed is:

1. A system for automatically setting an environment of a user terminal, comprising:

a space and context-aware device for sensing a space and a context using a plurality of sensors, defining environment setting information corresponding to the sensed space and context, and sending the defined environment setting information to a user terminal, thereby requesting environment setting or release; and a user terminal for changing environment setting mode while communicating with the space and context-aware device and automatically changing to a status corresponding to the environment setting information when the environment setting information is received, wherein the space and context-aware device, when the user terminal has entered a specific space or is in a specific context, sends an automatic environment setting ID assigned to the user terminal, and defines the environment setting information for the user terminal based on the specific space or the specific context when receiving a response message including the automatic environment setting ID and the environment setting information from the user terminal, and wherein the space and context-aware device, when the user terminal has moved out of the specific space or the specific context, defines automatic environment setting release information, sends the automatic environment setting release information to the user terminal, and eliminates the automatic environment setting ID and the environment setting information corresponding to the user terminal when receiving a response message from the user terminal.

2. A system for automatically setting an environment of a user terminal, comprising:

a space and context sensing unit for performing sensing on a user or a user terminal which is located in a specific space and a specific context using a multi-modal sensor unit, and outputting sensed information;

a space and context analysis unit for analyzing at least one of entry and exit, a location, a space, a direction, and a speed based on the sensed information, and defining environment setting information corresponding to the specific space or specific context; and an automatic environment setting communication unit for including the environment setting information transferred by the analysis unit in an environment setting change message, and sending the environment setting change message to the user terminal, wherein the analysis unit, when the user or user terminal has entered the specific space, sends an automatic environment setting ID assigned to the user terminal, and defines environment setting status information for the user terminal based on the specific space when receiving a response message including the automatic environment setting ID and the current environment setting status information from the user terminal, and wherein the analysis unit, when the user or user terminal has moved out of the specific space or specific context, defines automatic environment setting release information, sends the automatic environment setting release information to the user terminal via the communication unit, and eliminates the automatic environment setting ID and the environment setting status information corresponding to the user terminal when receiving the response message from the user terminal.

3. The system of claim 2, wherein the environment setting information is a command to control at least one of manner mode, call blocking, frequency blocking, and a reduction in call quality related to the user terminal.

4. The system of claim 2, wherein the multi-modal sensor unit comprises a Global Positioning System (GPS), a Radio-Frequency Identification (RFID) system, a speed sensor, an infrared sensor, a direction sensor, and an image sensor.

5. A method of automatically setting an environment of a user terminal, comprising:

sensing a user or a user terminal using a plurality of sensors by means of a multi-modal sensor unit, and outputting sensed information;

analyzing a space and a context based on the sensed information;

determining whether the user or user terminal has entered or exited into or from a specific space;

if the user or user terminal has entered the specific space, performing automatic environment setting communication with the user terminal; and requesting the user terminal to make a change to environment setting corresponding to the specific space, wherein the performing automatic environment setting communication comprises:

sending an assigned automatic environment setting ID to the user terminal; and receiving a response message including the automatic environment setting ID and the current environment setting status information from the user terminal, and wherein the method further comprises:

if the user or user terminal has moved out of the specific space, defining environment setting release information and sending the defined environment setting release information to the user terminal; and if a response message is received from the user terminal, eliminating an automatic environment setting ID and environment setting status information assigned to the user terminal.

6. The method of claim 5, wherein the requesting a setting change comprises:

defining environment setting information corresponding to the specific space or specific context; and including the defined environment setting information in an environment setting change message, and sending the environment setting change message to the user terminal.

7. The method of claim 6, wherein the environment setting information is a command to control at least one of manner mode, call blocking, frequency blocking, and a reduction in call quality related to the user terminal.

8. The method of claim 5, wherein the multi-modal sensor unit comprises a GPS, an RFID system, a speed sensor, an infrared sensor, a direction sensor, and an image sensor.

9. The method of claim 5, wherein the specific space is any one of an office, a theater, a performance hall, a train, a conference room, a classroom, an airplane, a hospital, and an automobile.

10. A method of automatically setting an environment of a user terminal, comprising:

receiving an automatic environment setting ID from a space and context-aware device after a user or a user terminal has entered into a specific space;

storing the received environment setting ID, and changing environment setting mode from manual setting mode to automatic environment setting mode; and when receiving environment setting change information from the space and context-aware device, automatically changing to a status corresponding to the environment setting change information, wherein the method further comprises:
if the user or user terminal is present in a context in the specific space, receiving the environment setting change information from the space and context-aware device which has sensed the presence of the user or user terminal;
automatically changing to an status corresponding to the environment setting change information;
if the user or user terminal has moved out of the specific space or specific context, receiving the automatic environment setting release information from the space and context-aware device which has sensed the movement out of the specific space or specific context; and
automatically changing an environment setting status to a previous environment setting status based on the automatic environment setting release information.

\* \* \* \* \*